Feb. 25, 1930.  W. M. SCOTT ET AL  1,748,497
CONTROL MECHANISM
Filed Sept. 20, 1926   5 Sheets-Sheet 1

INVENTORS
William M. Scott and
George A. Cook
BY
their ATTORNEY

Patented Feb. 25, 1930

1,748,497

UNITED STATES PATENT OFFICE

WILLIAM M. SCOTT, OF TREDDYFRIN TOWNSHIP, CHESTER COUNTY, AND GEORGE A. PACK, OF PHILADELPHIA, PENNSYLVANIA; SAID PACK ASSIGNOR TO SAID SCOTT

CONTROL MECHANISM

Application filed September 20, 1926. Serial No. 136,485.

Our invention relates to a system of control for a device operating upon an occurrence of an abnormal condition, as an electric switch, and more particularly, an automatic circuit breaker mechanism for controlling circuits traversed by current utilized for power, lighting and other purposes.

In accordance with our invention, a main switch, or an automatic circuit breaker, is moved to normal or circuit-closing position, after it has been opened, or tripped in response to overload, underload or other abnormal electrical condition, by an electro-motive device controlled by a control switch which is controlled by fluid, preferably hydraulic, control mechanism which permits the control switch to be moved a plurality of times in succession to position causing operation of the electro-motive device to effect a similar number of re-closures of the main switch or automatic circuit breaker, and which then locks the control switch in response to the cumulative effect upon a plunger or equivalent of successive masses of fluid forced by or applied under control of successive movements of another plunger or equivalent; and more particularly, our invention resides in fluid, and preferably hydraulic, control mechanism wherein the path for escape of fluid from a chamber receiving said first-named plunger is controlled exclusively by said second-named plunger.

Further in accordance with our invention, there is provided fluid or hydraulic control mechanism embodying actuating and operated plungers wherein there is provided a control for effecting passage of the actuating plunger through a predetermined distance in a predetermined time; and more particularly, the structure for effecting said control comprises adjustable means for regulating the discharge orifice of a path along which passes a fluid from the chamber containing said actuating plunger.

Our invention is an improvement of the invention described in a prior application filed solely by Scott, Serial No. 712,581, filed May 12, 1924.

Our invention resides in a system and apparatus of the character hereinafter described and claimed.

For an illustration of one of the various forms our invention may take, reference is to be had to the accompanying drawings, in which.

Referring to Figs. 2, 3, 4, 6, 7, 8 and 9, B is a base or panel of hard rubber or other suitable material forming a support for control mechanism of the character hereinafter described. Disposed to one side of the base B is a housing H comprising the plunger body receptacle or basin 1 to which is suitably secured the flange or shelf 2 of a block 3 upon which is disposed and to which is suitably secured the cap structure 4 shaped substantially as an inverted rectangular receptacle, Fig. 4. The three component parts of housing H are suitably and securely fastened together in the manner indicated and the structure thus produced is held fixed to the base B in any suitable manner, as by screws 5 passing therethrough and threaded into the block 3 and cap 4.

Figure 5:
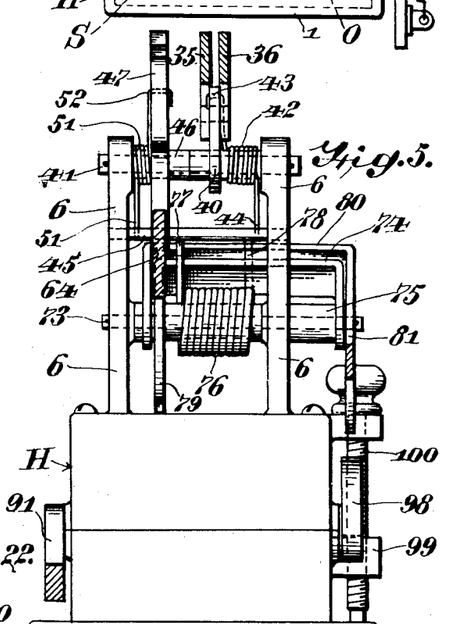
Figs. 5 and 6 are vertical sectional views, partly in elevation, taken on the lines 5—5 and 6—6 of Fig. 8.
Figures 6, 7, 10:
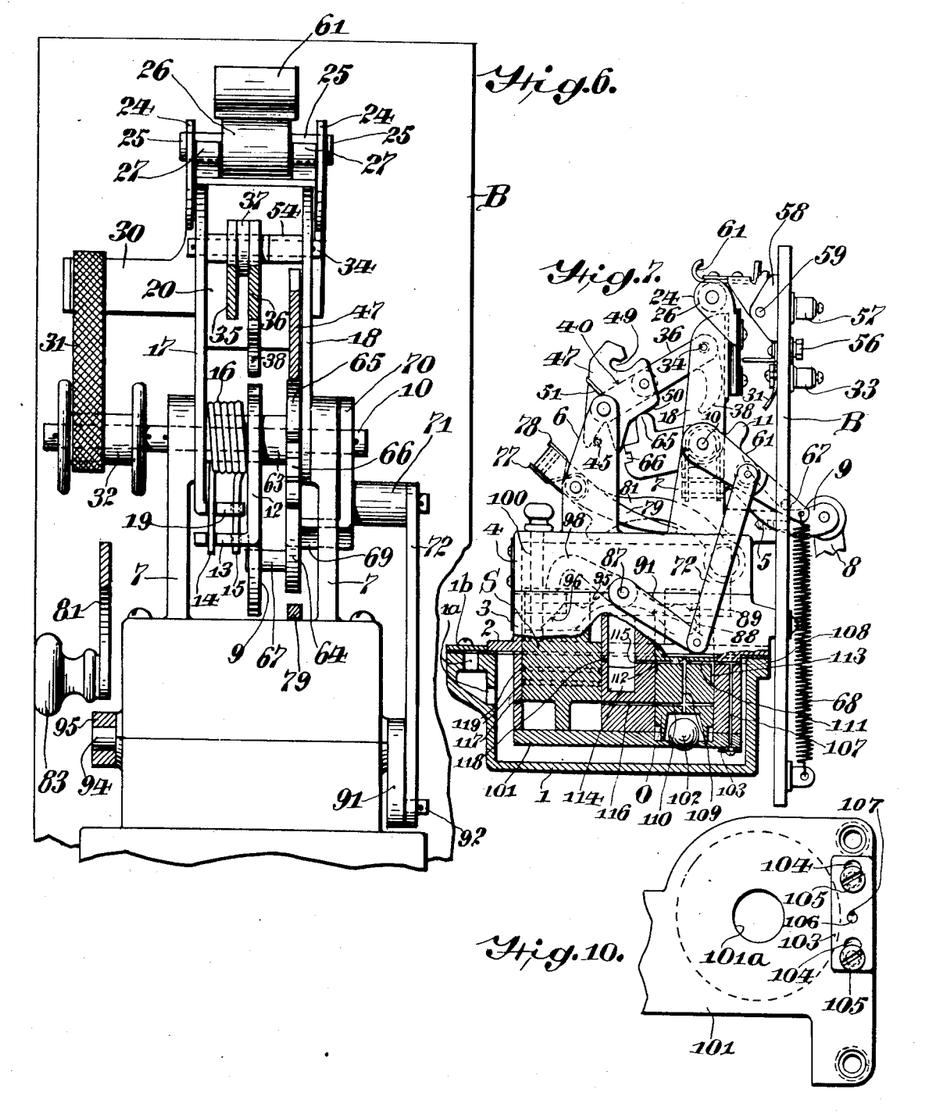
Fig. 7 is a side elevational view corresponding with Fig. 4, but with parts broken away and showing another position of the actuating plunger.
Fig. 10 is a fragmentary bottom plan view of a plate carried by the body or casting of the fluid control mechanism.
Figure 8:
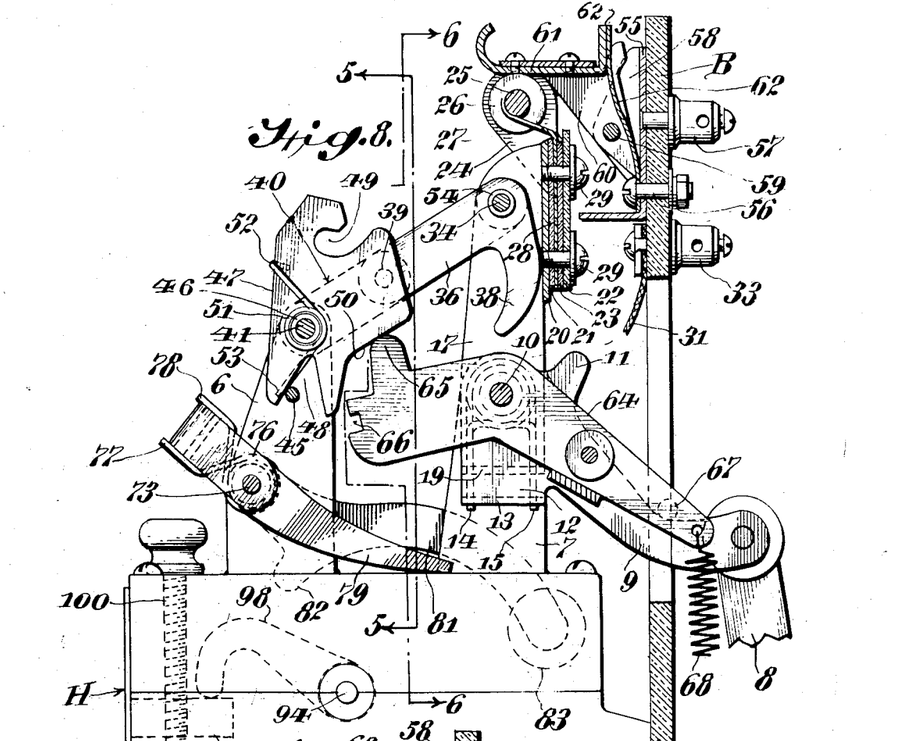
Figs. 8 and 9 are side elevational views, partly in section, illustrating the control switch mechanism.
Figure 9:
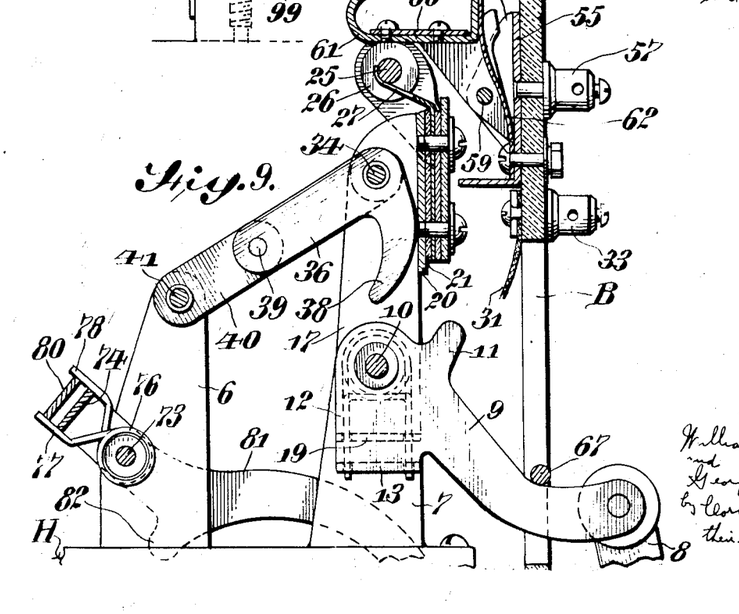

Rising from the upper horizontal portion of the cap structure 4, as viewed in Figs. 5, 8 and 9, is the pair of upwardly extending standards or arms 6, 6 disposed in suitable spaced relation and in a region of cap structure 4 between the standards 6 and base B is the substantially similar pair of upwardly extending standards or arms 7, 7, Fig. 6.

Disposed on the side of base B removed from housing H is an actuating member or link 8 arranged for movement in a vertical direction, as viewed in Figs. 1-4. Link 8 is pivoted to an arm 9 which passes through a suitable slot or passage in base B and is pivoted on a rod or member 10 passing through horizontally aligned perforations disposed near the upper extremities of the standards 7, Figs. 8 and 9. Arm 9 comprises an outwardly extending lug 11, utilizable as hereinafter described, and a downwardly extending arm 12, Figs. 6, 8 and 9, terminating in a lateral flange 13 having in each side edge a vertically extending slot or channel adapted to receive the ends 14 and 15 of a spring 16 coiled around the rod 10, Fig. 6.

Disposed between the standards 7 and pivoted on the rod 10 are the spaced arms 17 and 18 constituting the movable element of the control switch. In the example shown, a portion of arm 17 extends below the rod 10 and terminates in a flange 19 having slots in vertical alignment with the slots in flange 13 and adapted to receive, respectively, the ends 14 and 15 of spring 16. The upper extremities of arms 17 and 18 are joined by a transverse web or member 20, Fig. 6, preferably formed integrally therewith and against which abuts a member or plate 21 of suitable insulating material, preferably hard rubber or the like, Figs. 8 and 9, between which and a plate 22 of similar insulating material is mounted a plate-like member 23 of suitable conductive material which terminates in the spaced perforated ears 24, Fig. 6, forming bearings for a supporting rod or shaft 25 preferably having formed integrally therewith the cylindrical contact member 26. By preference shaft 25 and member 26 are held against casual rotative movement by spring arms 27 frictionally engaging said shaft and terminating in a plate 28 disposed between the plates 21 and 23. The aforesaid plate assembly may be maintained securely on web 20 in any suitable manner as by screws 29 passing through aligned perforations in the various plates and threaded into said web.

Conductive member 23 comprises a laterally extending member 30 to which is suitably secured a conductor 31, which, after passing around an insulating spool 32, mounted on the rod 10, is secured to a binding post or terminal 33 disposed on the base B.

Pivoted on a pin 34 mounted in aligned horizontal perforations in the arms 17 and 18 are the links 35 and 36 constituting one toggle element and maintained in spaced relation by the disk or washer 37, Fig. 6. As clearly illustrated in Figs. 8 and 9, link 36 terminates in the downwardly extending member 38. Pivoted at 39 to the pair of links 35 and 36 is a single link 40 constituting another toggle element and whose other end is rotatably mounted on the pin or rod 41 disposed in aligned horizontal perforations adjacent the upper extremities of the standards 6. Under some circumstances, it may be desirable to wrap a spring 42 around the pin 41, one end 43 of said spring being secured to the link 40 and the other end 44 thereof bearing against a rod 45 mounted in the standards 6 below the rod 41, Fig. 5. When utilized, spring 42 tends to rotate link 40 in a clockwise direction as viewed in Fig. 9 to close the toggle.

Rotatably mounted on the pin 41 is the bearing sleeve or cylinder 46 to which is secured the latch 47 comprising the conical shaped slot or opening 48 traversed by the pin 45, the re-entrant notch 49, and the plane surface 50. Encircling the sleeve 46 is a spring 51 whose one end 52 engages the latch 47 and whose other end 53 engages the pin 45, said spring biasing latch 47 in a clockwise direction, as viewed in Fig. 8.

Under certain circumstances, as hereinafter more particularly described, notch 49 of latch 47 engages or is hooked around a sleeve 54, Fig. 6, disposed on pin 34 to hold the movable switch element in the position indicated in Fig. 4.

Any suitable type of fixed contact structure may be provided for coaction with the movable contact 26. As herein shown, there is utilized a conductive bracket 55 secured to the base B by a bolt 56 and the shank of a binding post or terminal 57 disposed to the rear of said base adjacent the terminal 33, Fig. 8. Mounted in aligned horizontal perforations in the lateral flanges 58 of bracket 55 is the pin 59 upon which is pivotally mounted the supporting member 60 for the conductive plate 61 with which the roller 26 slidably coacts. Disposed between the head of screw 56 and bracket 55 is one end of the plate or leaf spring 62 whose other end coacts with the plate 61, said spring bearing supporting member 60 and plate 61 in a counter clockwise direction as viewed in Fig. 8.

Pivotally mounted on the rod 10 adjacent the arm 9 but spaced therefrom by the sleeve 63, Fig. 6, is the arm or latch member 64 having at its one end the lug 65 and the notch 66, Fig. 8. Adjacent its other end, member 64 comprises the lateral projection 67 adapted at times to coact with a depressed or angular portion of the arm 9. Clockwise rotative movement of member 64, as viewed in Fig. 8, may be effected in any suitable manner, preferably, however, by a spiral spring 68 secured at one end to member 64 and at its other end to the lower part of base B, Fig. 4.

Referring to Fig. 6, the member 64 is shown as comprising a lateral portion 69 to which is secured, preferably integrally, one end of an arm 70 whose other end is pivotally mounted on the pin 10 exteriorly of the right hand standard 7. Extending laterally from the member 70 is the member 71 upon whose reduced end is pivoted the link 72, utilizable as hereinafter described.

Extending transversely through the standards 6 adjacent the cap structure 4 is the pin or rod 73 on which are mounted the legs of an angular member 74, a spacing block or cylinder 75 being disposed between the right hand standard 6 and one leg of said member Fig. 5. Encircling the pin 73 is a coil spring 76 whose ends 77 and 78 lie on either side of the body of said member 74. One leg of member 74 comprises an elongated latch 79 which under certain circumstances enters the notch 66 of member 64 to prevent further operation of the control mechanism, as hereinafter more fully described. Disposed exteriorly of the member 74 is the second angular member 80 whose legs are likewise pivoted on the pin 73 and whose body portion is received between the ends 77 and 78 of spring 76. One leg of member 80 comprises an extension 81 having a lug 82 and an operating handle 83.

In the preferred form of our invention, the receptacle 1 contains a suitable volume of a fluid, as oil serving as a medium by which force is transmitted between a pair of pistons or plungers, as hereinafter particularly described. Preferably the oil is introduced to the receptacle through the passages 1ª closed by the cover 1ᵇ.

Figures 11, 12, 13, 14, 15, 16, 17, 18:
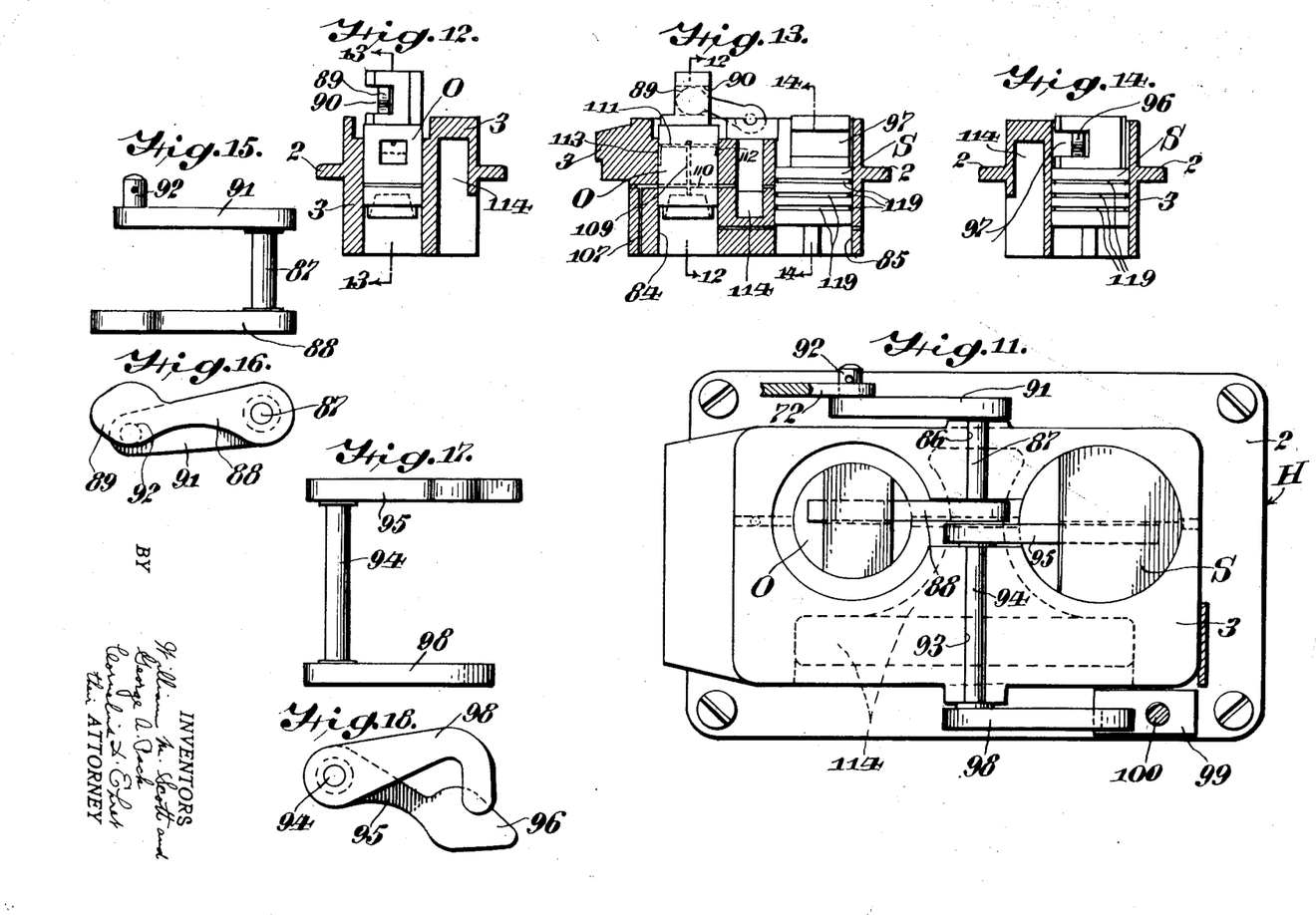
Fig. 11 is a plan view of the plunger body block or casting with the cap structure removed.
Fig. 12 is a front sectional view on the line 12—12 of Fig. 13.
Fig. 13 is a side sectional view taken on the line 13—13 of Fig. 12.
Fig. 14 is a front sectional view taken on the line 14—14 of Fig. 13.
Figs. 15 and 16 are, respectively, plan and front elevational views of the actuating plunger levers and connecting shaft.
Figs. 17 and 18 are, respectively, plan and front elevational views of the stop plunger levers and connecting shaft.
Figure 19:
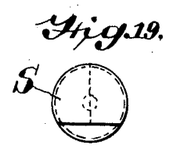
Figs. 19 and 20 are, respectively, plan and side elevational views of the stop plunger.
Figure 20:
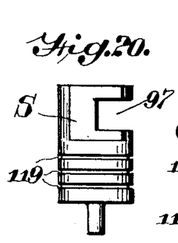
Figure 21:
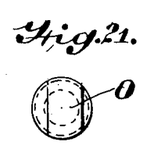
Figs. 21 and 22 are, respectively, plan and side elevational views of the actuating plunger.
Figures 22, 23:
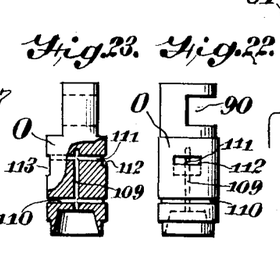
Fig. 23 is a side elevational view, partly in section, of the actuating plunger.

The block or casting 3 comprises two cylindrical passages 84 and 85 receiving, respectively, the plungers or pistons O and S, the former being the actuating or operating plunger and the latter the operated or stop plunger. As illustrated in Fig. 11, the upper or top surface of block 3 is grooved or channeled at 86 for the reception of a rod or shaft 87 to one end of which is secured an arm 88 whose end is preferably enlarged as indicated at 89 and passed into a suitable opening 90 in the upper portion of the actuating plunger O, Fig. 12. To the other end of shaft 87 is secured the member 91 connected by the lateral pin 92 with the aforesaid link 72.

Disposed in alignment with channel 86 is a second groove or channel 93 in which is mounted the rod or shaft 94 to one end of which is secured an arm 95 whose end is preferably enlarged as indicated at 96, Fig. 18 and disposed within an opening 97 in the upper portion of the stop plunger S. To the other end of shaft 94 is secured an arm or lever 98 whose end coacts with a block 99 maintained in a desired vertically adjusted position as viewed in Figs. 7 and 8 by the threaded rod 100.

Secured to the bottom of block 3 is the plate 101, Figs. 7 and 10, having the circular aperture 101A normally closed by the ball or sphere 102 which under certain circumstances is periodically raised by the actuating or operating plunger O whose lower portion is cut away to form a frusto-conical housing recess for said sphere. A plate 103 is provided with the slots 104, Fig. 10, through which pass the screws 105 whose ends are threaded into plate 101. Plate 103 is provided with an aperture 106 in registering relation, or partly so, with a passage 107 of relatively small cross-sectional area or diameter in the plate 101 and block 3. Passage 107 opens into a horizontally extending passage 108, as vewed in Figs. 4 and 7. one end of which communicates with the basin 1 and the other end with the cylindrical passage receiving the actuating plunger O.

Extending vertically, Fig. 7, through the operating plunger O and communicating with the recess receiving sphere 102 is a passage 109, whose diameter or cross-sectional area is large as compared to that of the passage 107, 108. Communicating with the passage 109 are the horizontally disposed passages 110 and 111 of cross-sectional area corresponding with that of passage 109. Each passage 110 and 111 extends entirely through the plunger O, passage 111 communicating with the downwardly extending passages or channels 112 and 113, Fig. 7, in the periphery of said plunger O.

The block 3 comprises a chamber 114, Fig. 7, in communication with the basin 1. Opening into chamber 114 is the passage 115 of relatively large cross sectional area, the other end of which communicates with the cylindrical passage receiving plunger O. Extending horizontally between the cylindrical passages receiving the plungers O and S, Fig. 7, is the passage 116 of relatively large cross-sectional area. As shown in Fig. 7, there is a passage 117 leading from basin 1 to the passage receiving the plunger S, while disposed thereabove and communicating with said basin 1 by way of the chamber 114 in block 3 is the passage 118. Passage 117 and the part of passage 108 to the right of passage 107, Fig. 7, are necessarily formed when the passages 116 and 115 are drilled and are entirely without function in the operation of the device. It shall be understood that they are plugged or closed in any suitable manner before assembly of the apparatus.

Preferably, the stop plunger S is provided with the circumferential grooves or channels 119 utilizable for the production of a film-like surface between said plunger S and the wall of the passage receiving the same.

Figure 1:
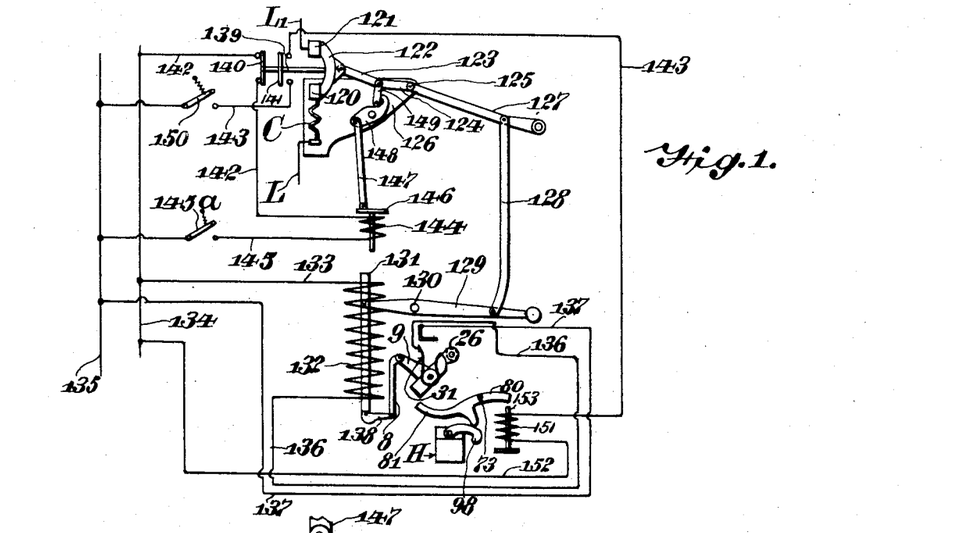
Fig. 1 is a diagrammatic illustration of certain electrical features of our invention.

Referring to Fig. 1 there is schematically illustrated one type of an electrical system with which the apparatus described above is utilizable. As indicated therein, L and L¹ are conductors of an electrical circuit to be protected against overload or other undesired condition. In the example shown, conductor L is connected through the overload coil C with the contact block or terminal 120, while conductor L is connected to a corresponding terminal 121. Terminals 120 and 121 are bridged by the movable contact member 122, preferably of laminated spring material of a type well understood in the art. Pivoted to the member 122 is one end of a toggle link 123, to whose other end is pivoted one end of the second toggle link 124, whose free end is pivoted at 125 in a frame or supporting member 126.

Controlling the aforesaid toggle is an arm 127, to which is pivoted one end of a link 128 whose other end is pivoted to a pair of spaced arms 129 pivoted at 130 on a suitable support, the other end of said arms 129 being suitably pivoted to the core or armature 131 of an electro-magnet or winding 132, one of whose terminals is connected by a conductor 133 with a conductor 134, which, and another conductor 135, are traversed by current supplied from the line in which the conductors L and L¹ are included or from any other suitable source. Branching from the other terminal of winding 132 is a conductor 136 connected to the binding post 33, which, as described above, is connected by the strap 31 with the pivoted arm of the control switch. Leading from the binding post 57 connected to the fixed element of the control switch is the conductor 137 connected to the conductor 135.

To the lower end of the core 131 is secured a member 138 pivoted to the aforesaid actuating member or link 8.

Supplementarily to the system thus far described, the contact member 122 may have secured thereto the rod or member 139 carrying the spaced conductive plates or members 140 and 141, the former, when contact member 122 is closed, bridging the terminals of a conductor 142, and the latter, when contact member 122 has moved from the terminals 120 and 121, bridging the terminals of a conductor 143.

One end of conductor 142 is connected to the supply conductor 134, while its other end is connected to one terminal of an electro-magnet or winding 144 whose other terminal is connected by a conductor 145, in which is included a switch 145ª to the supply conductor 135. Controlled by winding 144 is a core or armature 146, to which is pivoted one end of a link 147 whose other end is pivoted to a latch 148 pivoted on the frame 126 and co-acting with an arm 149 controlling the toggle members 123, 124.

A switch 150 is included in that end of the aforesaid conductor 143 which is connected to the supply conductor 135, while the other end of said conductor 143 is connected to one terminal of an electro-magnet or winding 151 whose other terminal is connected by a conductor 152 to the supply conductor 134. Actuated by winding 151 is a core or armature 153 adapted to coact with the member 80 to actuate latch 79.

Figure 2:
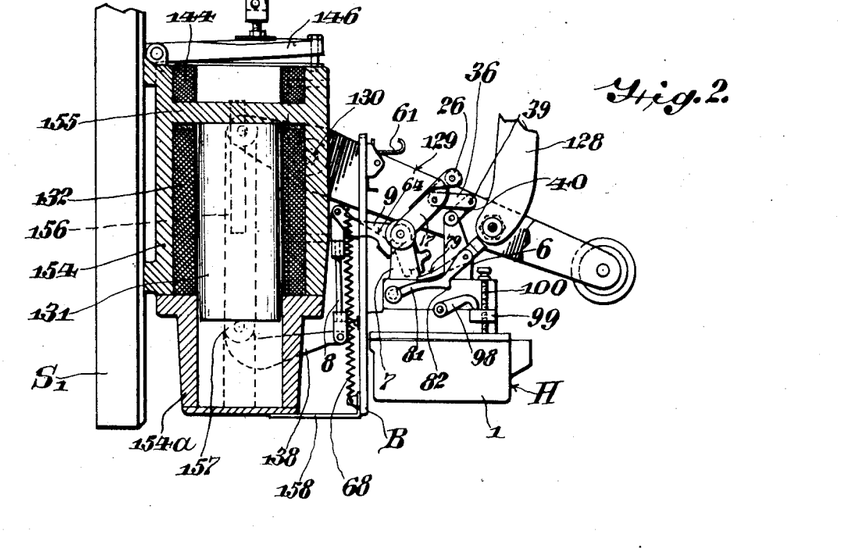
Fig. 2 is a side elevational view, partly in section, of a motive device and control mechanism carried thereby.
Figure 3:
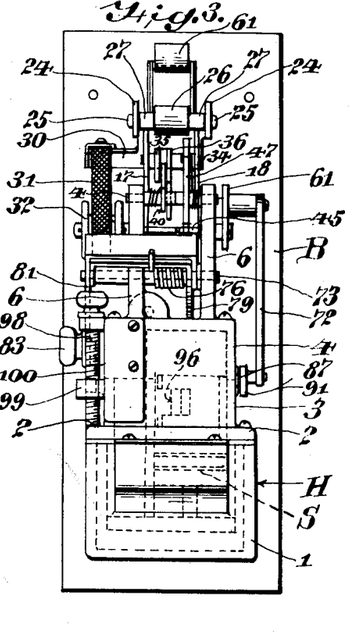
Figs. 3 and 4 are, respectively, front and side elevational views of the control mechanism.

A frame or member S¹ is utilized as a common support for substantially all the apparatus described herein, and, as indicated in Fig. 2, to the lower end of said support S¹ is secured a cylindrical member 154 divided into two chambers by a partition 155. In the upper chamber is disposed the aforesaid winding 144, while in the lower chamber is disposed the aforesaid winding 132.

Extending transversely of the core 131 and suitably secured thereto is a member 156 to each end of which is secured one end of a link 157, the other ends of said link being pivoted, respectively, to the ends of arms 129 which are pivoted on member 154 at 130.

Disposed below the member 154 and suitably secured thereto is a cylindrical member 154ª in which the core 131 is reciprocatory. Base B and the parts of the disconnecting switch carried thereby are suitably secured to member 157 in any suitable manner, as by the straps or members 158 and other connecting structure, not shown, adjacent the top of base B.

The operation is as follows:

With the control switch in the position illustrated in Fig. 7, that is, with its movable contact 26 in engagement with the conductive plate 61 and with the circuit breaker diagrammatically illustrated in Fig. 1 open because its movable contact member 122 is removed from the terminals 120 and 121, upon energization of the circuit comprising conductors 134 and 135, core or solenoid 131 is drawn upwardly, Figs. 1 and 2, the arm 129 is moved in a clockwise direction, link 128 and arm 127 are moved downwardly, Figs. 1 and 2, and the toggle comprising the members 123 and 124 is moved in such relation as to close the contact member 122 upon the terminals 120 and 121, thereby completing the circuit through the line conductors L, L¹.

During movement of the core 131 as described above, the actuating member or link 8 and the arm 9 pivoted thereto are moved in an upward direction as viewed in Figs. 8 and 9, and just before the contact member 122 closes upon its coacting terminals 120 and 121, lug 11 of arm 9 engages the downwardly extending member 38 of link 36, with resultant clockwise movement of said link 36 about its pivot 34, Figs. 8 and 9, whereby the toggle, one arm of which is the links 35 and 36 and the other arm of which is the link 40, is opened, and the end 14 of spring 16 snaps the arm 17, its flange 19 and the other parts of the movable structure of the control switch in a counter-clockwise direction, Figs. 8 and 9, to move the contact member 26 carried by said arm 17 from the plate 61 and thereby open the circuit through the winding 132. This action of spring 16 is possible because during upward movement of link 8 and arm 9, the flange 13 at the end of arm 9 carries the spring end 15 in a counter-clockwise direction, Figs. 8 and 9, to wind the spring.

Figure 4:
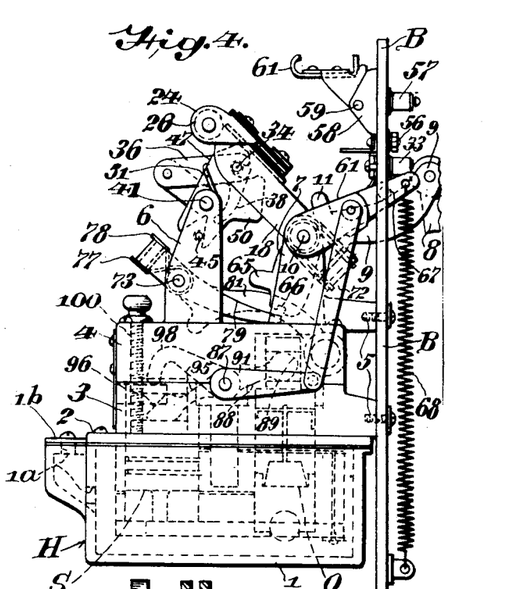

The movable structure of the control switch is maintained in the position illustrated in Fig. 4 to which it was moved as aforesaid by the latch 47, whose notch 49 engages the sleeve 54 mounted on the pin 34.

Upon upward movement of the actuating link 8 and arm 9 as aforesaid, the lateral projection 67 of member 64 is engaged by the angular portion of the arm 9, whereby said member 64 is moved in a counterclockwise direction, Fig. 8, expanding the helical spring 68 and effecting counterclockwise rotation of shaft 87, Fig. 7, through the connection comprising the members 91 and 72 between said shaft 87 and the arm 64. Due to the rotation of shaft 87 as thus effected, the actuating plunger O is moved from the position of Fig. 7 to that of Fig. 4, momentarily displacing the sphere 102 from the wall of opening 101A and by suction drawing a quantity of oil within the lower part of the cylindrical passage receiving the actuating plunger.

When the control switch opened, as above described, the circuit through winding 132 was opened at contact 26 and plate 61. Under normal circumstances, however, the core of solenoid 131 remains in its upper position, Fig. 1, under the control of latch 148.

However, if, upon closure of member 122 upon its terminals 120 and 121, an overload exists on the line, the circuit breaker will be immediately opened, in a manner well understood in the art, when latch 148 is moved the influence of coil C. As a result, due to the aforesaid mechanical connection between member 122 and core 131, the latter is moved downwardly, Figs. 1 and 4, as are the link 8 and arm 9, and the angular portion of arm 9 separates from the projection 67 on arm 64. It results, therefore, that a force is applied to the actuating plunger O to move the same downwardly, Fig. 4, inasmuch as the spring 68 in contracting moves the arm 64 in a clockwise direction, Fig. 8, whereby, due to the members 72 and 91, the shaft 87 is likewise rotated in clockwise direction. Resistance to downward movement of the actuating plunger O is offered by the body of oil thereneath, some of which, however, is forced along the passage 116 beneath the stop or operated plunger S. Downward movement of the actuating plunger O thus continues from the position indicated in Fig. 4 until the passage 116 is closed, whereupon, due to the fact that channel 113 is now in registering relation with passage 108, oil is transferred at a relatively slower rate to the basin 1 from beneath the operating plunger along the passages 109, 111, 113, 108, 107, and through the orifice of plate 103.

As downward movement of the actuating plunger O continues, the channel 112 at the end of passage 111 eventually comes into registering relation with the passage 115, whereupon more rapid transfer of oil from beneath the actuating plunger O is resumed, now by way of passages 109, 111, channel 112, passage 115, to chamber 114 and thence to basin 1. During the aforesasid movement of the operating plunger O from the position of Fig. 4, the lug 65 of arm 64 first rapidly approaches the plane surface 50 of latch 47 (during the period of oil transfer to beneath the stop plunger S by way of passage 116), then very slowly (during the period of oil transfer to the basin 1 by way of passage 107), and then after said lug 65 has moved to a region closely adjacent said plane surface 50, at an accelerated pace (during the period of oil transfer to the basin 1 by way of passage 111, 115, etc.). During the last described period of acceleration, lug 65 of arm 64 strikes a blow to latch 47 on its plane face 50 to move said latch in counter-clockwise direction, Fig. 8, and thereby withdraw notch 49 from engagement with the cylindrical sleeve 54. As a result, the end 15 of spring 16 throws the movable structure of the disconnecting switch from the position indicated in Fig. 4 to that indicated in Figs. 7, 8 and 9, closing the toggle comprising the links 35, 36 on the one hand, and the link 40 on the other hand. This action of spring 16 is possible due to the fact that during downward movement of the actuating link 8 and arm 9, as described above, the flanged end 13 of said arm 9 carries the spring end 14 in a clockwise direction, Figs. 8 and 9, to wind the spring.

Transfer of a predetermined quantity of oil beneath the stop plunger S as thus effected raises said plunger a predetermined distance, and through the arm 95 and shaft 94 the arm 98 is moved a predetermined distance toward the lug 82 on the leg 81 of angular member 80. It will be understood that due to the relatively large cross sectional area of the passage 116, the upward movement of the stop plunger S is effected in a relatively short period of time. Upon reaching the position to which elevated, said stop plunger so remains while the actuating plunger O continues first its slow and then its accelerated downward movement as above described. Just as the operating plunger O ceases downward movements, its passage 110 comes into registering relation with the passage 116, thereby opening a fluid path from beneath the stop plunger S by way of passages 116, 110, 109, 111 and 115 to the recess 114 in block 3.

If for any reason, when the lug 65 of arm 64 actuated latch 47 to permit the movable structure of the control switch to move to circuit closing position with consequent energization of winding 132, the circuit breaker was manually or otherwise prevented from closing, the core or solenoid 131 would be prevented from rising, and hence the actuating plunger O would remain in the position indicated in Fig. 7, and transfer of oil will be effected from beneath the stop plunger S as effected by its gravitational action by way of the aforesaid passages 116, 110, etc.

Usually, however, closure of the circuit breaker is not thus restrained, and consequently, upon energization of winding 132 as above described, its core or solenoid 131 is attracted, with resultant closure of the circuit breaker, and, in a manner similar to that heretofore described, the control switch is opened by lug 11 on arm 9 just as the circuit breaker closes. When core 131 was attracted as last described, oil was again drawn from reservoir 1 through passage 101A by the the actuating plunger O which rises to the position indicated in Fig. 4, where its passage 110 is in communication with passage 115.

Should the line now be in normal condition, the circuit breaker remains closed, and transfer of oil will be effected from beneath the stop plunger S to reservoir 1 by way of passage 116, the chamber beneath the actuating plunger O, passages 110, 109 and 111 of said plunger O, passage 115 and recess 114.

However, should the overload condition still exist on the line, the circuit breaker is again immediately opened, and core 131 is again moved downwardly, whereupon the angular portion of arm 9 again separates from the projection 67 on arm 64 and spring 68 again becomes effective to apply a downward force to the actuating plunger O, whereby the stop plunger S is moved an additional distance toward the lugs 82 of member 81.

Provided that there is no transfer of oil from beneath the stop plunger S for either of the reasons stated above, each tripping of the circuit breaker will result in an accumulative effect upon said plunger S with resultant approach of lever 98 toward lug 82. Finally, when lever 98 engages lug 82 and swings member 81 in a counter-clockwise direction, Figs. 8 and 9, latch 79 of member 74 is moved into the path of notch 66 comprised in the end of arm 64. Accordingly, rotative movement of arm 64 in a clockwise direction, Fig. 4, under the influence of spring 68, is prevented, and since it is the lug 65 of this arm which actuates latch 47 to permit closure of the control switch with resultant closure of the circuit breaker at its terminals 120 and 121, further automatic operation of any of the parts is precluded. At this time, the actuating plunger O is held in its upper position as indicated in Fig. 4, and hence the oil beneath stop plunger S is transferred to receptacle 1 along the passage 116, the chamber beneath the actuating plunger O, passages 110, 109 and 111 of said plunger O, passage 115 and recess 114.

The line circuit is now permanently locked open and may not again be closed at the terminals 120 and 121 until the latch 79 is withdrawn from engagement with notch 66. This may be effected manually by actuation of the operating handle 83 of member 80 or automatically and remote from the region wherein is located the switching mechanism herein described by actuating the suitably located switch 150, Fig. 1, to energize the winding 151, whereupon its solenoid 153 is moved upwardly to effect the desired movement of latch 79.

Should a further quantity of oil be passed into the chamber beneath stop plunger S after it reaches final elevated position, that oil or the oil displaced thereby may escape into recess 114 and receptacle 1 from the chamber beneath said stop plunger S by way of passage 118 which is uncovered when said stop plunger S is in the elevated position referred to above.

If, for any reason, as by engagement of member 98 with lug 82, latch 79 should be swung upwardly into the path of the end of arm 64 while the latter is moving toward the position indicated in Fig. 4, latch 79 and its member 74 and the end of spring 78 will be swung in a clockwise direction, Figs. 8 and 9, with respect to member 80, 81. In this manner, there is introduced a yielding connection between stop plunger S and latch 79 whereby damage to the parts is prevented should the mechanism operate as described immediately above.

Under certain circumstances, it may be desirable to open the circuit breaker independently of the automatic mechanism herein described. To this end, we have provided the switch 145, which upon closure effects energization of the winding 144 to move its armature 146 downwardly, Fig. 1, with resultant corresponding movement of link 147, accompanied by counter-clockwise rotative movement of latch 148, whereby the member 149 is actuated to open the toggle 123, 124 and remove the contact member 122 from its terminals 120 and 121.

An important feature of our invention resides in the control effected by the actuating plunger O on the control switch. In view of the foregoing explanation of our invention, it will be understood that the control switch remains in its open position during the period of time which elapses while the actuating plunger moves from upper to lower position. Hence, by suitably positioning the plate 103 and its orifice with respect to the discharge patch 107, any desired predetermined period of time may be chosen during which said actuating plunger O must pass from upper to lower position.

While in the preferred example of our invention hereinbefore described oil is utilized as the control fluid, it shall be understood that any other suitable liquid may be employed, or that there may be employed air, gas or other elastic fluid.

What we claim is:

1. The combination with a device operating upon occurrence of an abnormal condition and a motive device therefor, of mechanism for controlling said motive device comprising a fluid reservoir, a fluid-actuating member operating in response to operation of said device for translating fluid, a fluid-operated member moved by said translated fluid, and means comprising a varying path controlled by said actuating member for permitting flow of the translated fluid into said reservoir.

2. The combination with a device operating upon occurrence of an abnormal condition and a motive device therefor, of mechanism for controlling said motive device comprising a fluid reservoir, a fluid-actuating member operating in response to operation of said device for translating fluid, a fluid-operated member moved by said translated fluid, and means comprising a path controlled by the position of said actuating member for permitting flow of the translated fluid into said reservoir.

3. The combination with a device operating upon occurrence of an abnormal condition and a motive device therefor, of mechanism for controlling said motive device comprising a fluid reservoir, a fluid-actuating member operating in response to operation of said device for translating fluid, a fluid-operated member moved by said translated fluid, and means comprising a path in part traversing said actuating member and controlled thereby for permitting flow of the translated fluid into said reservoir.

4. The combination with a device operating upon occurrence of an abnormal condition and a motive device therefor, of mechanism for controlling said motive device comprising a movable member, and fluid-controlling means for varying the speed of said member.

5. The combination with a device operating upon occurrence of an abnormal condition and a motive device therefor, of mechanism for controlling said motive device comprising a movable member, fluid-controlling means for varying the speed of said member, and means for controlling said fluid-controlling means.

6. The combination with a device operating upon occurence of an abnormal condition and a motive device therefor, of mechanism for controlling said motive device comprising a movable member, and fluid-controlling means for retarding and then increasing the speed of said member.

7. The combination with a device operating upon occurrence of an abnormal condition and a motive device therefor, of mechanism for controlling said motive device comprising a movable member transfering fluid first along one path and then along a second path.

8. The combination with a device operating upon occurrence of an abnormal condition and a motive device therefor, of mechanism for controlling said motive device comprising a movable member transferring fluid first along one path and then along a second path, and means for controlling the rate of flow of fluid passing along said second path.

9. The combination with a device operating upon occurrence of an abnormal condition and a motive device therefor, of mechanism for controlling said motive device comprising a latch, an actuating member movable into engagement with said latch, and a speed-controlled member controlling said actuating member.

10. The combination with a device operating upon occurrence of an abnormal condition and a motive device therefor, of mechanism for controlling said motive device comprising a latch, an actuating member movable into engagement with said latch, and a member movable at low speed and then at relatively high speed for controlling said actuating member.

11. Control mechanism comprising a block having cylindrical passages interconnected by a fluid path, fluid-actuating and fluid-operated plungers in said passages, said fluid-operated plunger partaking of cumulative movements in response to sucessive fluid-actuating movements of said fluid-actuating plunger, a fluid-containing receptacle within which said block and plungers are received, a check valve interposed in a path leading directly from said receptacle to the passage in which said fluid-actuating plunger is received, and a control member controlled by said fluid-operated plunger.

12. Control mechanism comprising a block having cylindrical passages interconnected by a fluid path, fluid-actuating and fluid-operated plungers in said passages, said fluid-operated plunger partaking of cumulative movements in response to successive fluid-actuating movements of said fluid-actuating plunger, a fluid-containing receptacle within which said block and plungers are received, a check valve comprising an unrestrained member interposed in a path leading directly from said receptacle to the passage in which said fluid-actuating plunger is received, and a control member controlled by said fluid-operated plunger.

13. Control mechanism comprising a block having cylindrical passages interconnected by a fluid path, a fluid-operated plunger in one of said passages, a fluid-actuating plunger re-entrantly recessed at one end in another of said passages, said fluid-operated plunger partaking of cumulative movements in response to successive fluid-actuating movements of said fluid-actuating plunger, a fluid-containing receptacle within which said block and plungers are received, a check valve comprising an unrestrained member received at times within said recess and interposed in a path leading directly from said receptacle to the passage in which said fluid-actuating plunger is received, and a control member controlled by said fluid-operated plunger.

14. Control mechanism comprising a block having cylindrical passages interconnected by a fluid path, fluid-actuating and fluid-operated plungers in said passages, said fluid-operated plunger partaking of cumulative movements in response to successive fluid-actuating movements of said fluid-actuating plunger, a fluid-containing receptacle within which said block and plungers are received, a fluid path communicating with said receptacle and the cylindrical passage in which said fluid-actuating plunger is received, means for controlling the rate of flow of fluid discharged along said second-named path, and a control member controlled by said fluid-operated plunger.

15. Control mechanism comprising a block having cylindrical passages interconnected by a fluid path, fluid-actuating and fluid-operated plungers in said passages, said fluid-operated plunger partaking of cumulative movements in response to successive fluid-actuating movements of said fluid-actuating plunger, a fluid-containing receptacle within which said block and plungers are received, a fluid path communicating with said receptacle and the cylindrical passage in which said fluid-actuating plunger is received, means comprising an adjustable plate having an orifice which may be brought into a desired relation with respect to said second-named path for controlling the rate of flow of fluid passing therealong, and a control member controlled by said fluid-operated plunger.

16. Control mechanism comprising a block having cylindrical passages, fluid-actuating and fluid-operated plungers reciprocatorily mounted in said passage, a fluid-containing receptacle within which said block and plungers are received, a fluid path connecting said cylindrical passages, a second fluid path connecting said receptacle and fluid path within which said fluid-actuating plunger is received, said fluid-actuating plunger comprising a fluid path placing said first and second-named fluid paths in communication when said fluid-actuating plunger concludes its fluid-actuating movement.

17. Control mechanism comprising a block having cylindrical passages, fluid-actuating and fluid-operated plungers reciprocatorily mounted in said passage, a fluid-containing receptacle within which said block and plungers are received, a fluid path connecting said cylindrical passages, a second fluid path connecting said receptacle and fluid path within which said fluid-actuating plunger is received, said fluid-actuating plunger comprising a fluid path placing the cylindrical passage of said fluid-actuating member in communication with said second-named fluid path just prior to the time that said fluid-actuating plunger concludes its fluid-actuating movement.

18. Control mechanism comprising a block having cylindrical passages, fluid-actuating and fluid-operated plungers in said passages, a fluid-containing receptacle within which said block and plungers are received, a fluid path connecting said passages, a second fluid path whose cross-sectional area is relatively smaller than that of said first-named path connecting said receptacle and the passage in which said fluid-actuating plunger is received, said fluid-actuating plunger comprising a fluid path placing said last-named passage in communication with said second fluid path just as said fluid-actuating member closes said first-named fluid path.

19. The combination with an electric switch and a motive device for moving said switch to circuit-closing position, of mechanism for controlling said motive device comprising a block having cylindrical passages interconnected by a fluid path, fluid-actuating and fluid-operated plungers in said passages, a fluid-containing receptacle within which said block and plungers are received, a check valve interposed in a path leading from said receptacle to the passage in which said fluid-actuating plunger is received, means controlled by said motive device for elevating said fluid-actuating plunger when said switch moves to circuit-closing position to draw a body of fluid from said receptacle along said second-named path, and means controlling said last-named means for depressing said fluid-actuating plunger to pass a portion of said body of fluid along said first-named path and another portion thereof along another path leading to said receptacle independently of said second-named path.

20. The combination with a device operating upon occurrence of an abnormal condition and a motive device therefor, of a control switch controlling said motive device, mechanism for controlling said control switch comprising a fluid-operated plunger, a disengageable connection between said fluid-operated plunger and motive device, and means controlled by said fluid-operated plunger and controlling said control switch.

21. The combination with a device operating upon occurrence of an abnormal condition and a motive device therefor, of a control switch controlling said motive device, mechanism for controlling said control switch comprising a fluid-operated plunger, members forming a disengageable connection between said fluid-operated plunger and motive device, biasing means connected to the one of said members connected to said plunger, and means controlled by said fluid-operated plunger and controlling said control switch.

22. The combination with a device operating upon occurrence of an abnormal condition and a motive device therefor, of a control switch controlling said motive device, mechanism for controlling said control switch comprising a fluid-operated plunger, members forming a disengageable connection between said fluid-operated plunger and motive device, a helical spring adapted to be expanded by said motive device and connected to the one of said members connected to said plunger, and means controlled by said fluid-operated plunger and controlling said control switch.

23. The combination with a device operating upon occurrence of an abnormal condition and a motive device therefor, of a control switch controlling said motive device and comprising a fixed contact element and a toggle-carried movable contact element, means controlled by said motive device for opening said toggle, and means for closing said toggle at the conclusion of a predetermined period of time.

24. The combination with a device operating upon occurrence of an abnormal condition and a motive device therefor, of a control switch controlling said motive device and comprising a fixed contact element and a toggle-carried movable contact element, means controlled by said motive device for opening said toggle, and fluid-operated means for closing said toggle at the conclusion of a predetermined period of time.

25. The combination with a device operating upon occurrence of an abnormal condition and a motive device therefor comprising a member movable upon actuation of said motive device, of a control switch controlling said motive device and comprising a fixed contact element and a toggle-carried movable contact element, a member interposed in the path of said first-named member for opening said toggle, and fluid-operated means for closing said toggle at the conclusion of a predetermined period of time.

26. The combination with a device operating upon occurrence of an abnormal condition and a motive device therefor comprising a member movable upon actuation of said motive device, of a control switch controlling said motive device and comprising a fixed contact element and a toggle-carried movable contact element, a member interposed in the path of said first-named member for opening said toggle, a latch for holding said toggle in open position, and fluid-operated means for actuating said latch to permit closure of said toggle at the conclusion of a predetermined period of time.

WILLIAM M. SCOTT.
GEORGE A. PACK.